(12) United States Patent
Di Carlo et al.

(10) Patent No.: US 11,434,972 B2
(45) Date of Patent: Sep. 6, 2022

(54) PASSIVE LOCKABLE STRUT (71) Applicant: The Boeing Company, Chicago, IL (US)

(72) Inventors: Tony Di Carlo, Long Beach, CA (US); Raul Tomuta, Stanton, CA (US)

(73) Assignee: The Boeing Company, Chicago, IL (US)

( * ) Notice: Subject to any disclaimer, the term of this patent is extended or adjusted under 35 U.S.C. 154(b) by 778 days.

(21) Appl. No.: 16/280,948

(22) Filed: Feb. 20, 2019

(65) Prior Publication Data

US 2020/0263754 A1 Aug. 20, 2020

(51) Int. Cl.
*F16F 9/56* (2006.01)
*B64C 25/26* (2006.01)
*B64D 37/04* (2006.01)
*B64D 37/00* (2006.01)

(52) U.S. Cl.
CPC ............... *F16F 9/56* (2013.01); *B64C 25/26* (2013.01); *B64D 37/005* (2013.01); *B64D 37/04* (2013.01); *F17C 2270/0189* (2013.01)

(58) Field of Classification Search
CPC .......... B64C 25/26; F16F 9/56; B64D 37/005; B64D 37/04; F17C 2270/0189
See application file for complete search history.

(56) References Cited

U.S. PATENT DOCUMENTS

| | | | | |
|---|---|---|---|---|
| 5,650,230 A | * | 7/1997 | Huang | H02J 15/00 428/372 |
| 2005/0230195 A1 | * | 10/2005 | Jones | F15B 21/065 188/68 |
| 2015/0165860 A1 | * | 6/2015 | Soles | B60G 17/08 280/6.157 |
| 2016/0010717 A1 | * | 1/2016 | Tosovsky | F16F 9/535 188/267.2 |

FOREIGN PATENT DOCUMENTS

| | | | | |
|---|---|---|---|---|
| CA | 2828511 A1 | * | 4/2014 | ............. F16B 4/006 |
| CN | 106015438 A | * | 10/2016 | |

OTHER PUBLICATIONS

Rowe, "How do Magnetic Shocks Work?," TopSpeed, dated Jun. 23, 2015, accessed Feb. 20, 2019, 5 pages. https://www.topspeed.com/cars/how-do-magnetic-shocks-work-ar169914.html.

* cited by examiner

*Primary Examiner* — Melanie Torres Williams
(74) *Attorney, Agent, or Firm* — Yee & Associates, P.C.

(57) ABSTRACT

A passive lockable strut is presented. The passive lockable strut comprises a first end; a second end; a fluid chamber between and connected to the first end and the second end; and a fluid within the fluid chamber, wherein the fluid is configured to activate the passive lockable strut to place the passive lockable strut in a locked condition in response to a change in an operating condition applied to the passive lockable strut.

23 Claims, 8 Drawing Sheets

PASSIVE LOCKABLE STRUT

BACKGROUND INFORMATION

1. Field

The present disclosure relates generally to platforms and, more specifically, to struts for platforms. Yet more specifically, the present disclosure relates to struts that change between a locked condition and an unlocked condition.

2. Background

In some applications of struts, the expansion and contraction of structures attached to the strut introduces tensile/compresses forces on the strut. Undesirable tensile/compressive forces on a strut may lead to an undesirable performance of the strut.

Therefore, it would be desirable to have a method and apparatus that take into account at least some of the issues discussed above, as well as other possible issues.

SUMMARY

An illustrative embodiment of the present disclosure provides a passive lockable strut is presented. The passive lockable strut comprises a first end; a second end; a fluid chamber between and connected to the first end and the second end; and a fluid within the fluid chamber, wherein the fluid is configured to activate the passive lockable strut to place the passive lockable strut in a locked condition in response to a change in an operating condition applied to the passive lockable strut.

Another illustrative embodiment of the present disclosure provides a method of activating a passive lockable strut to place the passive lockable strut in a locked condition. A vehicle is operated, the vehicle comprising the passive lockable strut with a first end, a second end, and a fluid chamber between and connected to the first end and the second end. The passive lockable strut is activated to place the passive lockable strut in a locked condition in response to a change in an operating condition applied to the passive lockable strut, in which a fluid within the fluid chamber activates the passive lockable strut.

Yet another illustrative embodiment of the present disclosure provides a vehicle. The vehicle comprises a duct; a structure; and a passive lockable strut connected to the duct and the structure. The passive lockable strut comprises a first end connected to the structure; a second end connected to the duct; a fluid chamber between and connected to the first end and the second end; and a fluid within the fluid chamber. The fluid is configured to activate the passive lockable strut to place the passive lockable strut in a locked condition in response to a change in an operating condition applied to the passive lockable strut.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that passive temperatures from a cryogenic fuel tank can reach extremely low temperatures. For example, the passive temperatures from a cryogenic fuel tank can reach below −400° F.

The illustrative embodiments recognize and take into account that at sufficiently low temperatures, surrounding structures to the cryogenic fuel tank will shrink. The illustrative embodiments recognize and take into account that when structures change considerably in size, struts attached to the structures may be undesirably placed in tension.

The illustrative embodiments recognize and take into account that it would be desirable to address the expansion and contraction of structures in order to prevent undesirable tensile/compressive forces on a strut. Undesirable tensile/compressive forces on a strut may lead to an undesirable performance of the strut. It would be desirable to provide a strut with a capacity for controlling the changing between a set length or a variable length to accommodate a desired tensile/compression loading range for the strut.

The illustrative embodiments recognize and take into account that when a strut is present in an aircraft or spacecraft, it may be desirable for the strut to become rigid during takeoff or landing. The illustrative embodiments recognize and take into account that vibrations and dynamic loads of a plane's structure could potentially cause undesirable amounts of movement through the struts and potentially the cryogenic propulsion system during takeoff or landing. For example, excessive movement of the strut may lead to undesirable wear of the struts or lessening the lifetime of the strut. The illustrative embodiments recognize and take into account that for aircraft and spacecraft, taking off and landing introduces vibrations and large dynamic loads to the structure, and therefore a strut on the vehicle. The illustrative embodiments recognize and take into account that by placing the struts into a locked condition during takeoff and landing, the struts will not vary in length excessively. The illustrative embodiments recognize and take into account that by placing the struts into a locked condition during takeoff and landing undesirable wear of the struts may be reduced. The illustrative embodiments recognize and take into account that by placing the struts into a locked condition during takeoff and landing the lifetime of the struts may not be undesirably reduced by the takeoff and landing.

Traditionally, propulsion tubing in aircraft or spacecraft is supported with rigid struts. The rigid struts are desirably installed such that they provide the desired support during flight, but do not impede deflections during tanking operations when the tubing typically shrinks thermally, and the tanks typically expand due to pressure. These conflicting desirable states of support and compliance cause design in conventional struts to be undesirably complicated. In some cases, support during a flight phase is lower, or some preload due to the enforced displacements is carried into flight, and superimposed with other flight loads.

The illustrative embodiments recognize and take into account that reducing or eliminating preload in components is desirable in reusable platforms. The illustrative embodiments recognize and take into account that reducing or eliminating preloads in components may reduce at least one of maintenance or waste.

The illustrative embodiments recognize and take into account that an operator or a computer could send instructions to place a strut into a locked condition or an unlocked condition. While the strut is in an unlocked condition the strut has a variable length. While the strut is in the locked condition the strut will not vary in length. The illustrative embodiments further recognize and take into account that when an operator or a computer sends instructions, there may be an undesirable delay in placing the strut into a locked condition or an unlocked condition. The illustrative embodiments recognize and take into account that for vehicles with struts, onboard computers or communication devices may add an undesirable amount of weight to the vehicle. The illustrative embodiments recognize and take into account that providing an operator or a computer to send signals to the strut may be undesirably expensive. The illustrative embodiments recognize and take into account that providing instructions to the strut may add a significant amount of complexity to the strut.

The illustrative embodiments recognize and take into account that it may be desirable to create a lockable strut that does not use instructions. The illustrative embodiments recognize and take into account that it may be desirable to create a lockable strut at least one of as simply or as inexpensively as possible.

The illustrative examples provide simple and inexpensive means of providing support and compliance in a lockable strut. The illustrative examples provide a passive lockable strut that does not use instructions from an operator or a computer. The illustrative examples provide a self-regulating variable length strut. The illustrative examples provide a passively-controlled lockable strut. The illustrative examples provide a passive lockable strut that, when used in a cryogenic system of an aircraft or spacecraft, supports cryogenic propulsion tubing with minimal life-limiting preload during flight.

Figure 1:
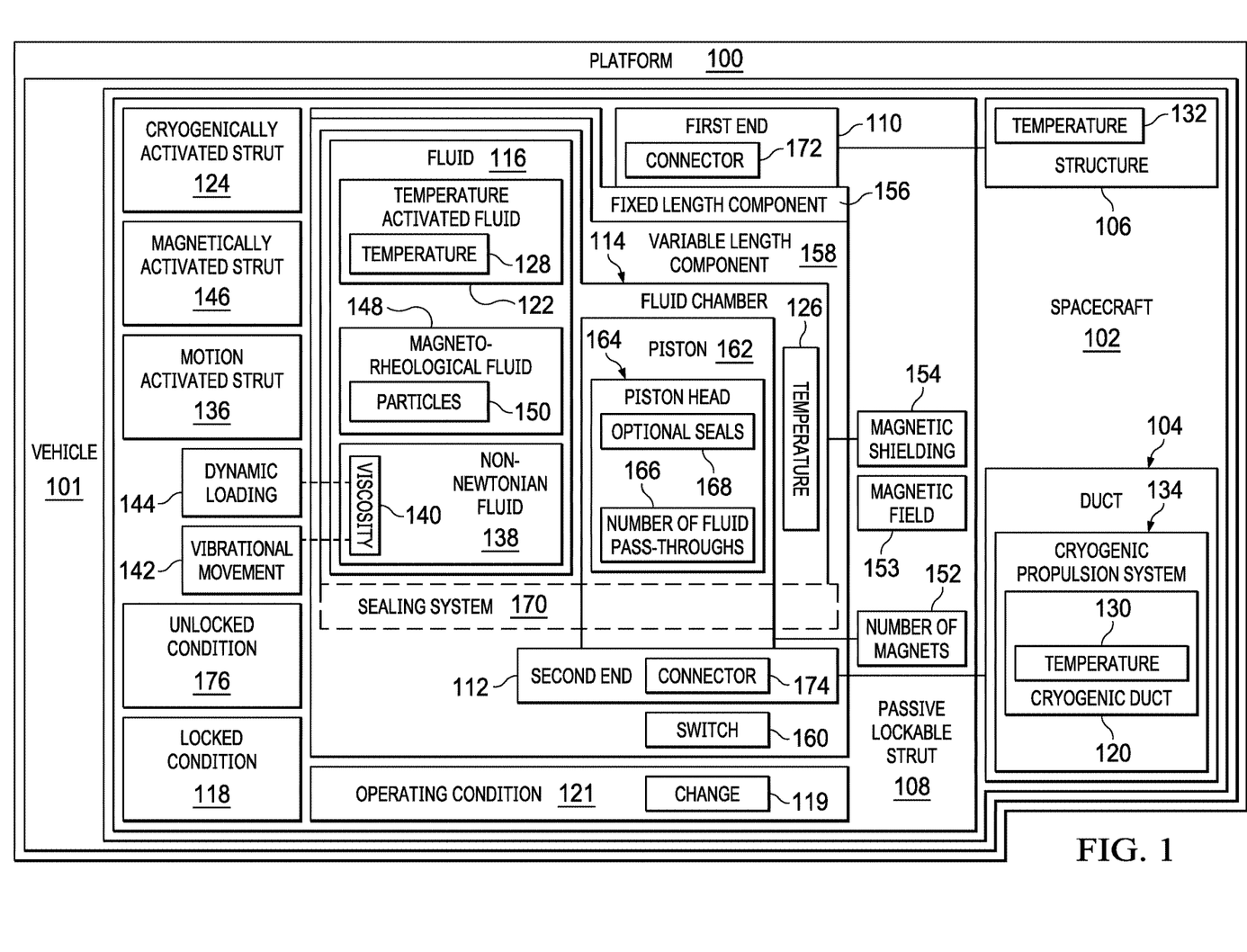
FIG. 1 is an illustration of a block diagram of a platform in which a passive lockable strut operates in accordance with an illustrative embodiment.

Turning now to FIG. 1, an illustration of a block diagram of a platform in which a passive lockable strut operates is depicted in accordance with an illustrative embodiment. Platform 100 takes any desirable form. In some illustrative examples, platform 100 takes the form of vehicle 101. Although the illustrative examples are described with respect to vehicle 101, an illustrative example may be applied to other types of platforms. Platform 100 may be, for example, a mobile platform, a stationary platform, a land-based structure, an aquatic-based structure, or a space-based structure. More specifically, platform 100 may be a surface ship, a tank, a personnel carrier, a train, a spacecraft, a space station, a satellite, a submarine, an automobile, a power plant, a bridge, a dam, a house, a manufacturing facility, a building, or other suitable platforms. In some illustrative examples, platform 100 takes the form of spacecraft 102.

Vehicle 101 comprises duct 104, structure 106, and passive lockable strut 108 connected to duct 104 and structure 106. Passive lockable strut 108 comprises first end 110, second end 112, fluid chamber 114 between and connected to first end 110 and second end 112; and fluid 116 within the fluid chamber 114. Fluid 116 is configured to activate passive lockable strut 108 to place passive lockable strut 108 in locked condition 118 in response to change 119 in operating condition 121 applied to passive lockable strut 108. First end 110 is connected to structure 106. Second end 112 is connected to duct 104. Change 119 in operating condition 121 takes any desirable form.

In some illustrative examples, duct 104 is cryogenic duct 120 and fluid 116 is temperature activated fluid 122. When fluid 116 is temperature activated fluid 122, passive lockable strut 108 may be referred to as cryogenically activated strut 124. When fluid 116 is temperature activated fluid 122, change 119 in operating condition 121 is a change in temperature 126.

Fluid 116 has temperature 128 below which fluid 116 will freeze. Fluid 116 is selected to provide a desirable value for temperature 128. When temperature 126 in fluid chamber 114 drops below temperature 128, temperature activated fluid 122 places cryogenically activated strut 124 in locked condition 118. When temperature 126 in fluid chamber 114 drops below temperature 128, temperature activated fluid 122 freezes to place cryogenically activated strut 124 in locked condition 118. When temperature activated fluid 122 is frozen, temperature activated fluid 122 is frozen on both sides of piston 162. Freezing temperature activated fluid 122 on both sides of piston 162 stops the tension and compression motion in passive lockable strut 108.

When cryogenic duct 120 operates, cryogenic duct 120 operates at temperature 130. In some illustrative examples, temperature 130 may operate near −400° F. (Fahrenheit). When temperature 130 operates near −400° F., temperature 126 is also below 0° F. In some illustrative examples, temperature 126 is below −50° F.

Temperature 128 of fluid 116 is configured to place passive lockable strut 108 into locked condition 118 at a desired time for passive lockable strut 108. For example, temperature 128 is tailored to provide locked condition 118 based on a location of passive lockable strut 108.

Temperature 126 of fluid chamber 114 is affected by a distance of fluid chamber 114 from cryogenic duct 120 when cryogenic duct 120 is functioning. As a length of passive lockable strut 108 changes, temperature 126 of fluid chamber 114 will vary based on the length of passive lockable strut 108. Temperature 128 of fluid 116 can be tailored to provide a desired behavior at different lengths. Tailoring temperature 128 of fluid 116 allows for locking passive lockable strut 108 at a set length. Tailoring temperature 128 of fluid 116 allows for controlling passive lockable strut 108 based on a location of fluid chamber 114 within passive lockable strut 108.

In some illustrative examples, cryogenic duct 120 is part of cryogenic propulsion system 134. In some illustrative examples, when cryogenic propulsion system 134 is inactive, temperature 132 and temperature 126 increase, placing passive lockable strut 108 into unlocked condition 176.

In some illustrative examples, fluid 116 is configured to place passive lockable strut 108 in locked condition 118 in response to temperature 128 being equivalent to or below the freezing temperature of fluid 116. In some illustrative examples, cryogenic duct 120 is a portion of cryogenic propulsion system 134. In these illustrative examples, passive lockable strut 108 is used to support components of cryogenic propulsion system 134. By placing passive lockable strut 108 in locked condition 118 only at desired times, passive lockable strut 108 will not be undesirably placed in tension when structures near a cryogenic system shrink.

In some illustrative examples, prior to takeoff, components of cryogenic propulsion system 134, such as cryogenic duct 120 shrink due to temperature. In these illustrative examples, passive lockable strut 108 in unlocked condition 176 does not preload the system due to cryogenic duct 120 shrinking. Temperature 128 is equivalent to or below the freezing temperature of fluid 116 after cryogenic duct 120 has shrunk. In these illustrative examples, passive lockable strut 108 is placed into locked condition 118 after cryogenic duct 120 has shrunk. In these illustrative examples, passive lockable strut 108 in locked condition 118 is not under undesirable amounts of tension due to preloading during takeoff.

In some other illustrative examples, passive lockable strut 108 takes the form of motion activated strut 136. In these illustrative examples, fluid 116 is non-Newtonian fluid 138 configured to lock passive lockable strut 108 using at least one of dynamic loading 144 or vibrational movement 142 during take-off or landing of vehicle 101. In some illustrative examples, fluid 116 is non-Newtonian fluid 138 and change 119 in operating condition 121 is an application of at least one of dynamic loading 144 or vibrational movement 142 to second end 112.

In some illustrative examples, motion activated strut 136 takes advantage of vibrations during takeoff to place passive lockable strut 108 into locked condition 118. When a shear force is applied to non-Newtonian fluid 138, fluid 116 increases viscosity 140. When a shear force is not applied to fluid 116, non-Newtonian fluid 138 flows easily. A direct force, such as dynamic loading 144 or vibrational movement 142, causes non-Newtonian fluid 138 to "thicken" into a semisolid. A direct force, such as dynamic loading 144 or vibrational movement 142, causes viscosity 140 of non-Newtonian fluid 138 to increase. When present in fluid chamber 114, non-Newtonian fluid 138 will flow at least one of through or around piston head 164 under low loads, but "thicken" under vibrational movement 142 or dynamic loading 144. When non-Newtonian fluid 138 thickens into a semisolid, passive lockable strut 108 is placed into locked condition 118 and prevented from changing in length. For example, when platform 100 is spacecraft 102 or an aircraft, low loads on a runway allow non-Newtonian fluid 138 to flow. During takeoff, non-Newtonian fluid 138 experiences at least one of vibrational movement 142 or dynamic loading 144, causing passive lockable strut 108 to be placed into locked condition 118.

Non-Newtonian fluid 138 can be used in passive lockable strut 108 in any desirable location of platform 100. In some illustrative examples, lock-up of non-Newtonian fluid 138 is leveraged in propulsion tubing support struts as a relatively simple, inexpensive, and passive means of providing structural support for dynamic inertial and vibratory loads, while also maintaining stress-free compliance against quasi-static deflections due to thermal contractions, and other associated structural deflections, such as tank expansion. Switch 160 including non-Newtonian fluid 138 dynamically forms the rigid structural connection which is used to transfer flight loads, but allows relatively unrestricted stress-free motion at low speed, which is used to minimize undesirable life-limiting structural preload carried into flight. Non-Newtonian fluid 138 allows for a much simpler and cheaper implementation compared to traditional precision orifice flow type devices.

In some illustrative examples, passive lockable strut 108 takes the form of magnetically activated strut 146. In these illustrative examples, fluid 116 is magneto-rheological fluid 148 configured to lock passive lockable strut 108 when magnetic field 153 is applied to fluid chamber 114. Particles 150 of magneto-rheological fluid 148 react with applied magnetic field 153 to place passive lockable strut 108 into locked condition 118.

In some illustrative examples, passive lockable strut 108 comprises piston 162 connected to second end 112 and one of number of magnets 152 or magnetic shielding 154 connected to piston 162. As used herein, a "number of" items is one or more items. For example, number of magnets 152 is one or more magnets. In some illustrative examples, passive lockable strut 108 comprises magnetic shielding 154 connected to a portion of fluid chamber 114, piston 162 connected to second end 112, and number of magnets 152 connected to piston 162. In some illustrative examples, passive lockable strut 108 comprises magnetic shielding 154 connected to piston 162 and number of magnets 152 connected to a portion of fluid chamber 114.

In these illustrative examples, change 119 in operating condition 121 is an application of magnetic field 153 to fluid chamber 114. In some illustrative examples, change 119 in operating condition 121 further comprises applying magnetic field 153 in response to movement of second end 112 towards first end 110.

As depicted, piston 162 is connected to second end 112. In some illustrative examples, number of magnets 152 is connected to piston 162. In these illustrative examples, movement of piston 162 relative to fluid chamber 114 also moves number of magnets 152 relative to magnetic shielding 154. When number of magnets 152 move past magnetic shielding 154 and act upon particles 150 of magneto-rheological fluid 148, passive lockable strut 108 is placed into locked condition 118.

In some illustrative examples, magnetic shielding 154 is connected to piston 162. In these illustrative examples, movement of piston 162 relative to fluid chamber 114 also moves magnetic shielding 154 relative to number of magnets 152. When magnetic shielding 154 moves past number of magnets 152 and number of magnets 152 acts upon particles 150 of magneto-rheological fluid 148, passive lockable strut 108 is placed into locked condition 118.

Magneto-rheological fluid 148 is a viscous liquid that is able to flow, but becomes semisolid upon application of a magnetic field. During operation, the loads move at least one of first end 110 or second end 112 of passive lockable strut 108 relative to the other. The positioning of magnetic shielding 154 is configured such that when a load applied to passive lockable strut 108 reaches a set amount, number of magnets 152 apply magnetic field 153 to fluid chamber 114, placing passive lockable strut 108 into locked condition 118.

Passive lockable strut 108 has fixed length component 156 and variable length component 158. Variable length component 158 operates as switch 160 for passive lockable strut 108 to move passive lockable strut 108 between unlocked condition 176 and locked condition 118. In some illustrative examples, variable length component 158 is referred to as a variable length switch.

Passive lockable strut 108 further comprises piston 162 having piston head 164 within fluid chamber 114, wherein fluid chamber 114, fluid 116, and piston 162 form switch 160 for passive lockable strut 108. To provide a desirable amount of resistance to movement, piston head 164 of piston 162 has number of fluid pass-throughs 166 and optional seals 168. Number of fluid pass-throughs 166 have any desirable quantity, size, shape, and location on piston head 164. When present, optional seals 168 are located between the interior wall of fluid chamber 114 and piston head 164. Sealing system 170 maintains fluid 116 within fluid chamber 114 as piston head 164 moves within fluid chamber 114. Sealing system 170 is formed of any desirable type and any desirable quantity of seals.

An activation type for passive lockable strut 108 is chosen based on operating parameters including desired strut functions and anticipated sustained forces. An activation type for passive lockable strut 108 is selected based on support strut operating conditions: including to if the strut reacts sustained quasi-static acceleration; whether the support is subject to substantial tanking deflection; and the sustained structural temperatures.

The illustration of platform 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although platform 100 is depicted as having only passive lockable strut 108, platform 100 has any desirable quantity of passive lockable struts. In some illustrative examples, platform 100 includes a plurality of passive lockable struts. In some illustrative examples, platform 100 includes a plurality of passive lockable struts with a plurality of different types of activation mechanisms. For example, platform 100 may include a plurality of passive lockable struts with at least one of a cryogenically activated strut, a magnetically activated strut, or a motion activated strut.

As another example, although not depicted, piston 162 may have a feature that reduces or prevents axial twisting of piston 162 within fluid chamber 114. In these examples, piston 162 could be "keyed" to fluid chamber 114. When piston 162 has features to reduce or prevent axial twisting, axial adjustments are performed at first end 110 and second end 112. In some other illustrative examples, axial twisting of piston 162 is allowed within fluid chamber 114 by the design of piston 162 and fluid chamber 114.

As yet another example, although spacecraft 102 is depicted, vehicle 101 may instead be an aircraft or other type of aerospace platform or aerospace vehicle. In some illustrative examples, first end 110 and second end 112 are connected to components of an aircraft.

First end 110 has connector 172 to connect passive lockable strut 108 to structure 106. Connector 172 takes any desirable form. Any desirable components may be present in addition to connector 172 to join first end 110 to structure 106.

Second end 112 has connector 174 to connect passive lockable strut 108 to duct 104. Connector 174 takes any desirable form. Any desirable components may be present in addition to connector 174 to join second end 112 to duct 104.

Figure 2:
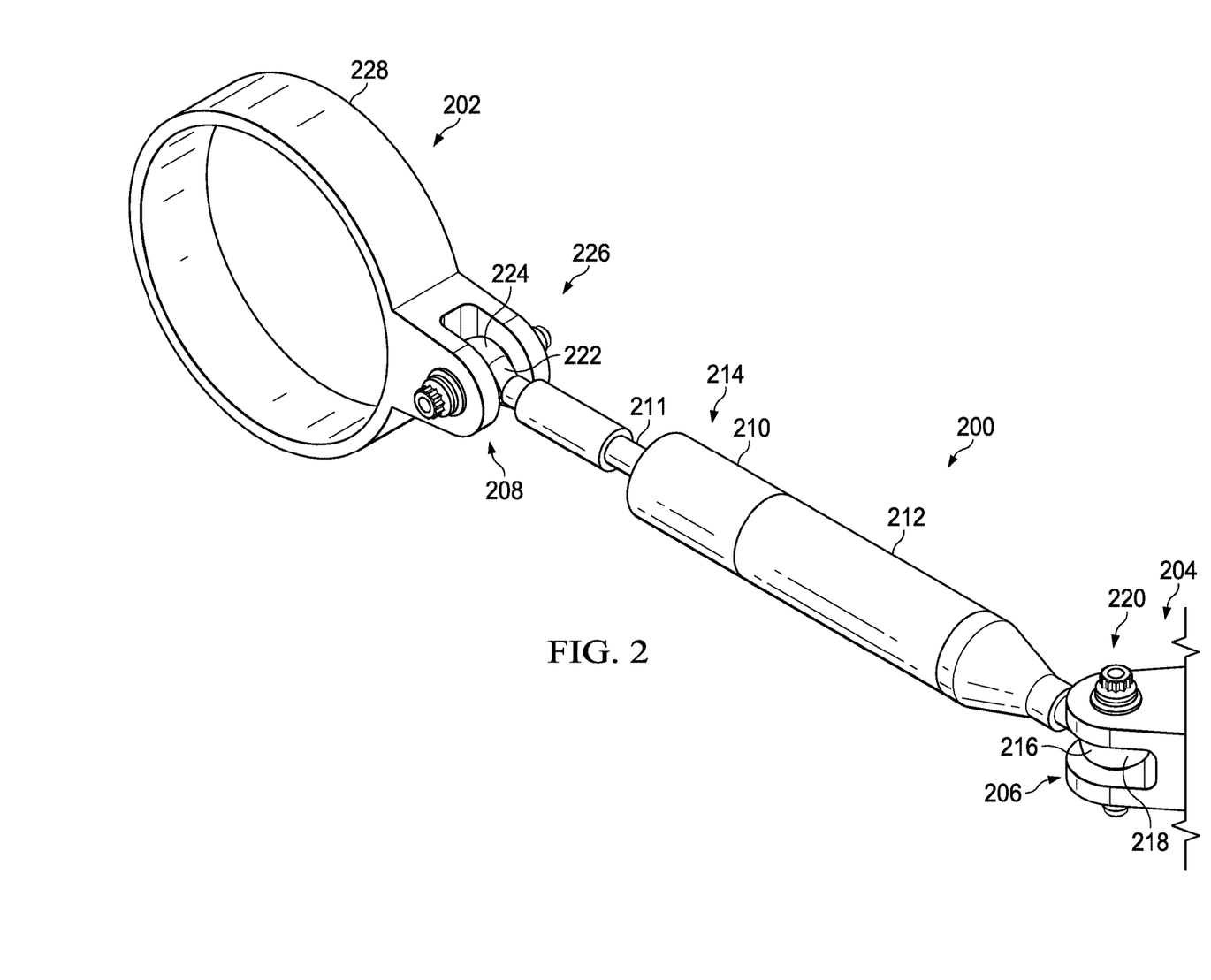
FIG. 2 is an illustration of a passive lockable strut attached to a duct and a structure in accordance with an illustrative embodiment.

Turning now to FIG. 2, an illustration of a passive lockable strut attached to a duct and a structure is depicted in accordance with an illustrative embodiment. Passive lockable strut 200 is a physical implementation of passive lockable strut 108 of FIG. 1. As depicted, passive lockable strut 200 is connected to duct 202 and structure 204. Passive lockable strut 200 is configured to be placed into a locked condition in response to a change in an operating condition applied to passive lockable strut 200.

When passive lockable strut 200 is in a locked condition, the length of passive lockable strut 200 doesn't vary. When passive lockable strut 200 is in an unlocked condition, passive lockable strut 200 has a variable length during operation.

As depicted, passive lockable strut 200 comprises first end 206, second end 208, and fluid chamber 210. First end 206 is connected to structure 204. Second end 208 is connected to duct 202. Fluid chamber 210 is connected to first end 206 and second end 208.

Passive lockable strut 200 comprises fixed length component 212 and variable length component 214. Variable length component 214 comprises fluid chamber 210 and piston 211. Fixed length component 212 is positioned between variable length component 214 and second end 208. To modify passive lockable strut 200 for a specific use, fixed length component 212 may be exchanged for a fixed length component of a different length. Changing a length of fixed length component 212 changes a possible range of lengths for passive lockable strut 200.

First end 206 has connector 216. As depicted, connector 216 is rod end bushing 218 forming part of single pin joint 220 joining passive lockable strut 200 to structure 204. Joint 220 including connector 216 may be referred to as a strut & clevis attachment. In some illustrative examples, joint 220 is a stack up of bolts, washer bushings, rod end bushings, washers, and nuts.

In some illustrative examples, because of the shrinking of duct 202 and structure 204 due to the extremely low temperatures, the rod ends of passive lockable strut 200, such as rod end bushing 218 and rod end bushing 224, are attached to the ducts and the structure with single pin joints (a.k.a. strut & clevis attachment) with a spherical bearing to allow for multi-axial movement. The multi-axial movement provided by a spherical bearing avoids excessive tensile/compressive forces while passive lockable strut 200 is locked and rigid.

In some illustrative examples, although not visible in FIG. 2, piston 211 may have a feature that reduces or prevents axial twisting of piston 211 within fluid chamber 210. In these examples, piston 211 could be "keyed" to fluid chamber 210. When piston 211 has features to reduce or prevent axial twisting, axial adjustments are performed at first end 206 and second end 208.

Second end 208 has connector 222. As depicted, connector 222 is rod end bushing 224 forming part of single pin joint 226 joining passive lockable strut 200 to duct 202. Joint 226 including connector 222 may be referred to as a strut & clevis attachment. In some illustrative examples, joint 226 is a stack up of bolts, washer bushings, rod end bushings, washers, and nuts.

Passive lockable strut 200 takes the form of either a motion-activated strut or a cryogenically-activated strut. When passive lockable strut 200 takes the form of a motion-activated strut, specific types of movement of duct 202 and structure 204 relative to each other activates passive lockable strut 200 to place passive lockable strut 200 in a locked condition. For example, when duct 202 and structure 204 are part of an aircraft or spacecraft, at least one of dynamic loading or vibrational movement during take-off or landing activates passive lockable strut 200.

When passive lockable strut 200 takes the form of a cryogenically-activated strut, a change in temperature of fluid chamber 210 places passive lockable strut 200 into locked condition 118. In some illustrative examples, a change in temperature of fluid chamber 210 to place passive lockable strut 200 into locked condition 118 is due to environmental conditions surrounding duct 202, structure 204, and passive lockable strut 200. In some illustrative examples, a change in temperature of fluid chamber 210 to place passive lockable strut 200 into locked condition 118 is due to operation of duct 202. In these illustrative examples, duct 202 is cryogenic duct 228 and flowing a cryogenic fluid through cryogenic duct 228 causes a change in temperature of fluid chamber 210.

The illustration of FIG. 2 is not meant to imply physical or architectural limitations to the manner in which an illustrative embodiment may be implemented. Other components in addition to or in place of the ones illustrated may be used. Some components may be unnecessary.

For example, passive lockable strut 200 may be connected to a component other than duct 202. For example, passive lockable strut 200 may be connected to a beam, a skin, a tank, a structural component, or any other desirable type of component.

Figure 3:
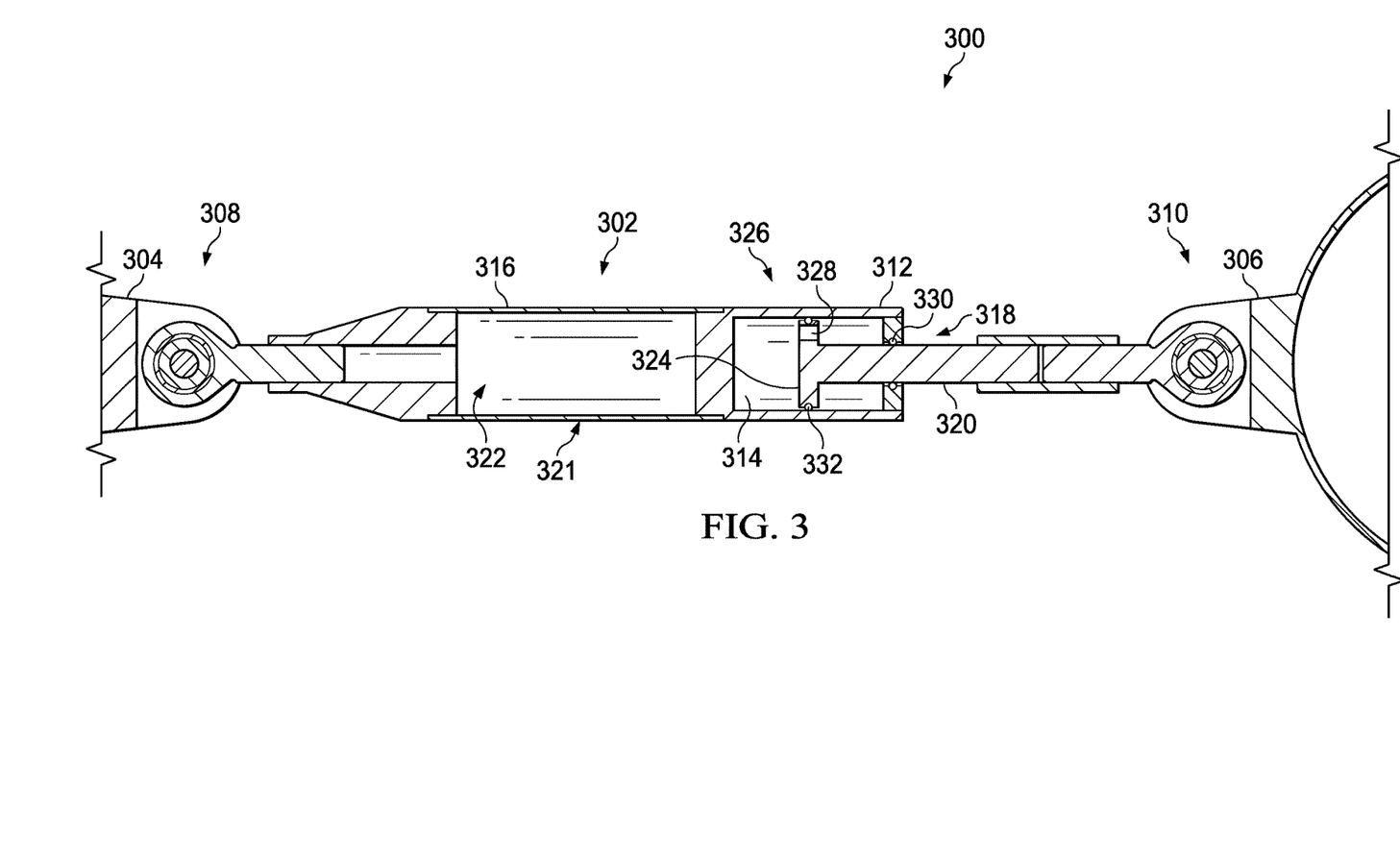
FIG. 3 is an illustration of a cross-sectional view of a passive lockable strut attached to a duct and a structure in accordance with an illustrative embodiment.

Turning now to FIG. 3, an illustration of a cross-sectional view of a passive lockable strut attached to a duct and a structure is depicted in accordance with an illustrative embodiment. In some illustrative examples, view 300 is a cross-sectional view of passive lockable strut 200, duct 202, and structure 204 of FIG. 2. Passive lockable strut 302 is a physical implementation of passive lockable strut 108 of FIG. 1.

Passive lockable strut 302 is connected to structure 304 and duct 306. Passive lockable strut 302 is configured to be placed into a locked condition in response to a change in an operating condition applied to passive lockable strut 302.

As depicted, passive lockable strut 302 comprises first end 308, second end 310, fluid chamber 312, and fluid 314 within fluid chamber 312. Fluid 314 is configured to activate passive lockable strut 302 to place passive lockable strut 302 in a locked condition in response to a change in an operating condition applied to passive lockable strut 302. First end 308 is connected to structure 304. Second end 310 is connected to duct 306. Fluid chamber 312 is connected to first end 308 and second end 310.

Passive lockable strut 302 comprises fixed length component 316 and variable length component 318. Variable length component 318 comprises fluid chamber 312 and piston 320. The length of variable length component 318 changes during operation as piston 320 moves within fluid chamber 312.

Fixed length component 316 is positioned between variable length component 318 and second end 310. To modify passive lockable strut 302 for a specific use, fixed length component 316 may be exchanged for a fixed length component of a different length. Changing a length of fixed length component 316 changes a possible range of lengths for passive lockable strut 302. As depicted, fixed length component 316 is shaft 321. Fixed length component 316 is hollow 322. By fixed length component 316 being hollow 322, a weight of passive lockable strut 302 is reduced.

Piston 320 has piston head 324 within fluid chamber 312. As depicted, fluid chamber 312, fluid 314, and piston 320 form variable length switch 326 for passive lockable strut 302. Variable length switch 326 enables passive lockable strut 302 to change length when passive lockable strut 302 is in an unlocked condition. Variable length switch 326 places passive lockable strut 302 in a locked condition in response to a change in an operating condition of passive lockable strut 302.

Piston head 324 has number of fluid pass-throughs 328. Number of fluid pass-throughs 328 has any desirable shape, size, quantity, and locations of pass-throughs to allow fluid 314 to move at least one of through or around piston head 324 as piston head 324 moves within fluid chamber 312.

Passive lockable strut 302 has sealing system 330 in variable length switch 326. Sealing system 330 maintains fluid 314 within fluid chamber 312 even as piston 320 moves relative to fluid chamber 312. Sealing system 330 comprises any desirable type, size, and quantity of seals at any desirable locations to maintain fluid 314 within fluid chamber 312.

The illustration of FIG. 3 is not meant to imply physical or architectural limitations to the manner in which an illustrative embodiment may be implemented. Other components in addition to or in place of the ones illustrated may be used. Some components may be unnecessary.

As depicted, lockable strut 302 has optional seal 332 associated with piston head 324. As depicted, optional seal 332 is positioned between piston head 324 and the interior wall of fluid chamber 312. However, in other non-depicted examples, optional seal 332 is not present. Further, in other non-depicted examples, sealing system 330 has a different size, quantity, or location of seals.

As another example, passive lockable strut 302 may be connected to a component other than duct 306. For example, passive lockable strut 302 may be connected to a beam, a skin, a tank, a structural component, or any other desirable type of component.

Figure 4:
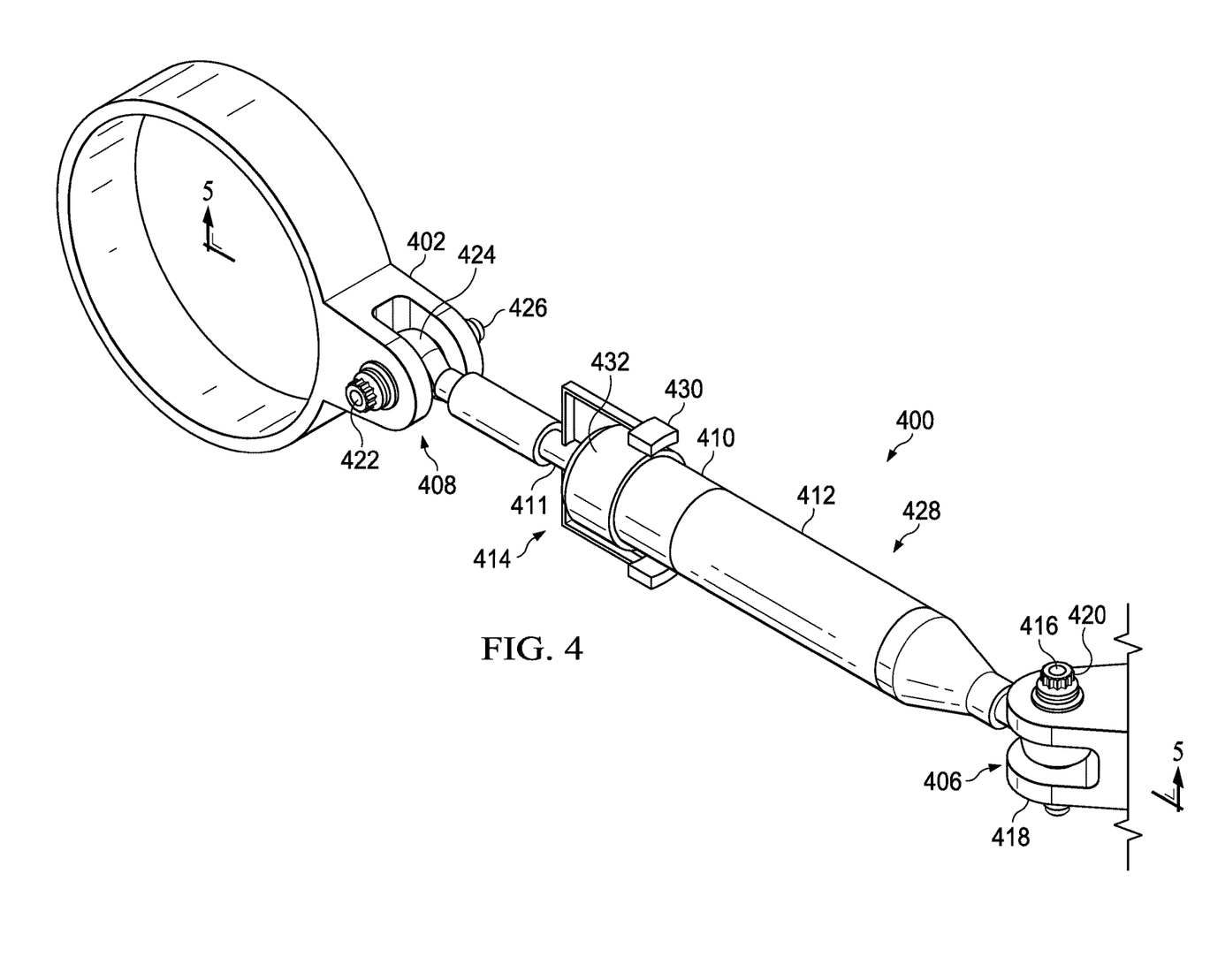
FIG. 4 is an illustration of a passive lockable strut attached to a duct and a structure in accordance with an illustrative embodiment.

Turning now to FIG. 4, an illustration of a passive lockable strut attached to a duct and a structure is depicted in accordance with an illustrative embodiment. Passive lockable strut 400 is a physical implementation of passive lockable strut 108 of FIG. 1. As depicted, passive lockable strut 400 is connected to duct 402 and structure 404. Passive lockable strut 400 is configured to be placed into a locked condition in response to a change in an operating condition applied to passive lockable strut 400.

As depicted, passive lockable strut 400 comprises first end 406, second end 408, and fluid chamber 410. First end 406 is connected to structure 404. Second end 408 is connected to duct 402. Fluid chamber 410 is connected to first end 406 and second end 408.

Passive lockable strut 400 comprises fixed length component 412 and variable length component 414. Variable length component 414 comprises fluid chamber 410 and piston 411. Fixed length component 412 is positioned between variable length component 414 and first end 406. To modify passive lockable strut 400 for a specific use, fixed length component 412 may be exchanged for a fixed length component of a different length. Changing a length of fixed length component 412 changes a possible range of lengths for passive lockable strut 400.

First end 406 has connector 416. As depicted, connector 416 is rod end bushing 418 forming part of a single pin joint 420 joining passive lockable strut 400 to structure 404. Joint 420 including connector 416 may be referred to as a strut & clevis attachment. In some illustrative examples, joint 420 is a stack up of bolts, washer bushings, rod end bushings, washers, and nuts.

Second end 408 has connector 422. As depicted, connector 422 is rod end bushing 424 forming part of a single pin joint 426 joining passive lockable strut 400 to duct 402. Joint 426 including connector 422 may be referred to as a strut & clevis attachment. In some illustrative examples, joint 426 is a stack up of bolts, washer bushings, rod end bushings, washers, and nuts.

Passive lockable strut 400 takes the form of magnetically activated strut 428. Magnetically activated strut 428 also has number of magnets 430 and magnetic shielding 432. Magnetic shielding 432 is connected to a portion of fluid chamber 410.

As depicted, piston 411 is connected to second end 408. Number of magnets 430 is connected to piston 411. As piston 411 moves relative to fluid chamber 410, number of magnets 430 also move relative to fluid chamber 410. When number of magnets 430 move past magnetic shielding 432, number of magnets 430 apply a magnetic field to fluid chamber 410. In these illustrative examples, a magnetic field is applied to fluid chamber 410 in response to a change in operating condition, wherein the change in operating condition is a change in position of second end 408 relative to first end 406.

Applying a magnetic field to fluid chamber 410 applies the magnetic field to a magneto-rheological fluid within fluid chamber 410. Applying the magnetic field to the magneto-rheological fluid places passive lockable strut 400 into a locked condition.

The illustration of FIG. 3 is not meant to imply physical or architectural limitations to the manner in which an illustrative embodiment may be implemented. Other components in addition to or in place of the ones illustrated may be used. Some components may be unnecessary.

As an example, passive lockable strut 400 may be connected to a component other than duct 402. For example, passive lockable strut 400 may be connected to a beam, a skin, a tank, a structural component, or any other desirable type of component.

Figure 5:
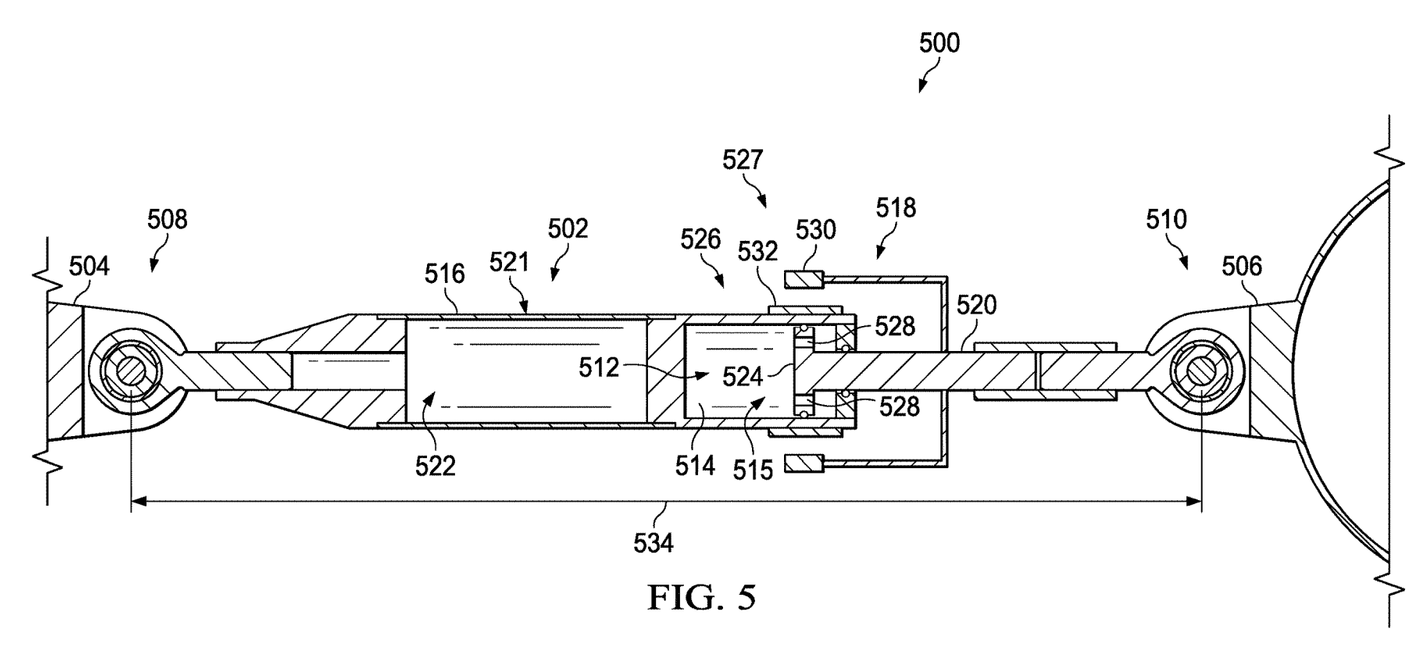
FIG. 5 is an illustration of a cross-sectional view of a passive lockable strut in a form of a magnetically activated strut in accordance with an illustrative embodiment.

Turning now to FIG. 5, an illustration of a cross-sectional view of a passive lockable strut in the form of a magnetically activated strut is depicted in accordance with an illustrative embodiment. In some illustrative examples, view 500 is a cross-sectional view of passive lockable strut 400, duct 402, and structure 404. Passive lockable strut 502 is a physical implementation of passive lockable strut 108 of FIG. 1.

Passive lockable strut 502 is connected to structure 504 and duct 506. Passive lockable strut 502 is configured to be placed into a locked condition in response to a change in an operating condition applied to passive lockable strut 502.

As depicted, passive lockable strut 502 comprises first end 508, second end 510, fluid chamber 512, and fluid 514 within fluid chamber 512. Fluid 514 is configured to activate passive lockable strut 502 to place passive lockable strut 502 in a locked condition in response to a change in an operating condition applied to passive lockable strut 502. First end 508 is connected to structure 504. Second end 510 is connected to duct 506. Fluid chamber 512 is connected to first end 508 and second end 510.

Passive lockable strut 502 comprises fixed length component 516 and variable length component 518. Variable length component 518 comprises fluid chamber 512 and piston 520. Fixed length component 516 is positioned between variable length component 518 and second end 510. To modify passive lockable strut 502 for a specific use prior to installation, fixed length component 516 may be exchanged for a fixed length component of a different length. Fixed length component 516 may be exchanged for a fixed length component of a different length when passive lockable strut 502 is not in use. Fixed length component 516 may be modified prior to installation or as a retrofit while fixed length component 516 is not in use. Changing a length of fixed length component 516 changes a possible range of lengths for passive lockable strut 502. As depicted, fixed length component 516 is pipe 521. Pipe 521 is hollow 522. By fixed length component 516 being hollow 522, a weight of passive lockable strut 502 is reduced.

Piston 520 has piston head 524 within fluid chamber 512. As depicted, fluid chamber 512, fluid 514, and piston 520 form variable length switch 526 for passive lockable strut 502. Variable length switch 526 enables passive lockable strut 502 to change length when passive lockable strut 502 is in unlocked condition 527. Variable length switch 526 places passive lockable strut 502 in a locked condition in response to a change in an operating condition of passive lockable strut 502.

Piston head 524 has number of fluid pass-throughs 528. Number of fluid pass-throughs 528 has any desirable shape, size, quantity, and locations of pass-throughs to allow fluid 514 to move at least one of through or around piston head 524 as piston head 524 moves within fluid chamber 512. The shape, size, quantity, and locations of number of fluid pass-throughs 528 are selected to provide a desirable amount of resistance to movement of piston head 524. The shape, size, quantity, and locations of number of fluid pass-throughs 528 are selected to set a desired amount of force to move piston head 524 in fluid chamber 512.

As depicted, passive lockable strut 502 takes the form of a magnetically activated strut. Passive lockable strut 502 has number of magnets 530 and magnetic shielding 532. Magnetic shielding 532 is connected to a portion of fluid chamber 512.

As depicted, piston 520 is connected to second end 510. Number of magnets 530 is connected to piston 520. As piston 520 moves axially relative to fluid chamber 512, number of magnets 530 also move relative to fluid chamber 512. For example, as piston 520 moves towards or away from first end 508, number of magnets 530 also move towards or away from first end 508. When piston 520 moves towards first end 508, number of magnets 530 also move towards first end 508. When number of magnets 530 move sufficiently towards first end 508, number of magnets 530 will move past magnetic shielding 532. When number of magnets 530 move past magnetic shielding 532, number of magnets 530 apply a magnetic field to fluid chamber 512. In these illustrative examples, a magnetic field is applied to fluid chamber 512 in response to a change in operating condition, wherein the change in operating condition is a change in position of second end 510 relative to first end 508.

In this illustrative example, fluid 514 is magneto-rheological fluid 515. Applying a magnetic field to fluid chamber 512 applies the magnetic field to magneto-rheological fluid 515 within fluid chamber 512. Applying the magnetic field to magneto-rheological fluid 515 places passive lockable strut 502 into a locked condition.

In FIG. 5, piston 520 is connected to second end 510 but a turnbuckle. In some illustrative examples, if passive lockable strut 502 is to be installed with piston 511 at a specific starting position in fluid chamber 512, the turnbuckle provides the mechanics to adjust length 534 of passive lockable strut 502 without moving position of piston 511 in fluid chamber 512.

Figure 6:
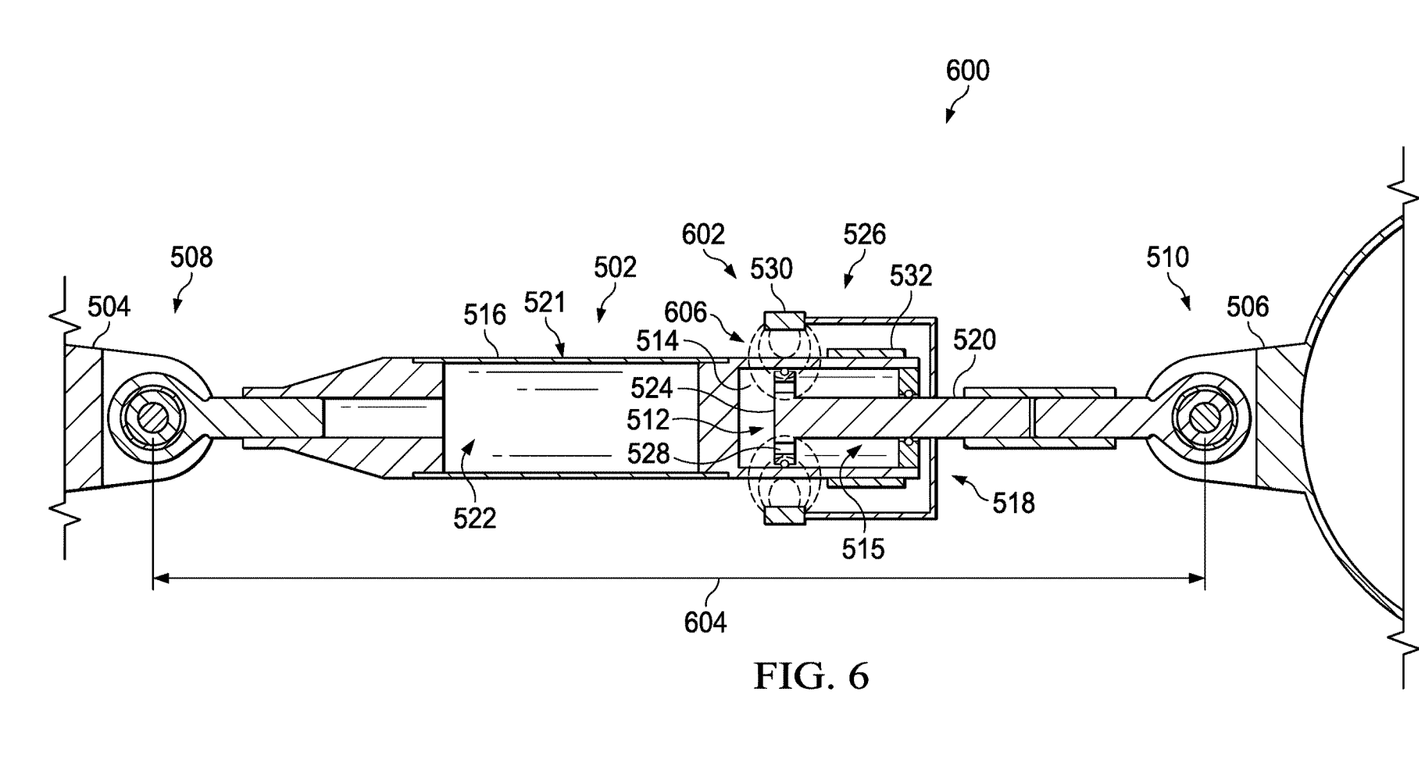
FIG. 6 is an illustration of a cross-sectional view of a passive lockable strut in a form of a magnetically activated strut in accordance with an illustrative embodiment.

Turning now to FIG. 6, an illustration of a cross-sectional view of a passive lockable strut in the form of a magnetically activated strut is depicted in accordance with an illustrative embodiment. View 600 is a view of the magnetically activated strut, passive lockable strut 502 of FIG. 5 in locked condition 602. In view 600, length 604 of passive lockable strut 502 is less than length 534 of passive lockable strut 502 in FIG. 5.

As depicted, piston 520 is connected to second end 510. Number of magnets 530 is connected to piston 520. In view 600, piston 520 has moved axially relative to fluid chamber 512 in view 500. Between view 500 and view 600, piston 520 has moved towards first end 508. In view 600, number of magnets 530 apply magnetic field 606 to fluid chamber 512. In this illustrative example, magnetic field 606 is applied to fluid chamber 512 in response to a change in operating condition, wherein the change in operating condition is a change in position of second end 510 relative to first end 508.

Applying magnetic field 606 to fluid chamber 512 applies the magnetic field to magneto-rheological fluid 515 within fluid chamber 512. Applying magnetic field 606 to magneto-rheological fluid 515 increases the apparent viscosity of magneto-rheological fluid 515. Applying magnetic field 606 to magneto-rheological fluid 515 places passive lockable strut 502 into locked condition 602.

Figure 7:
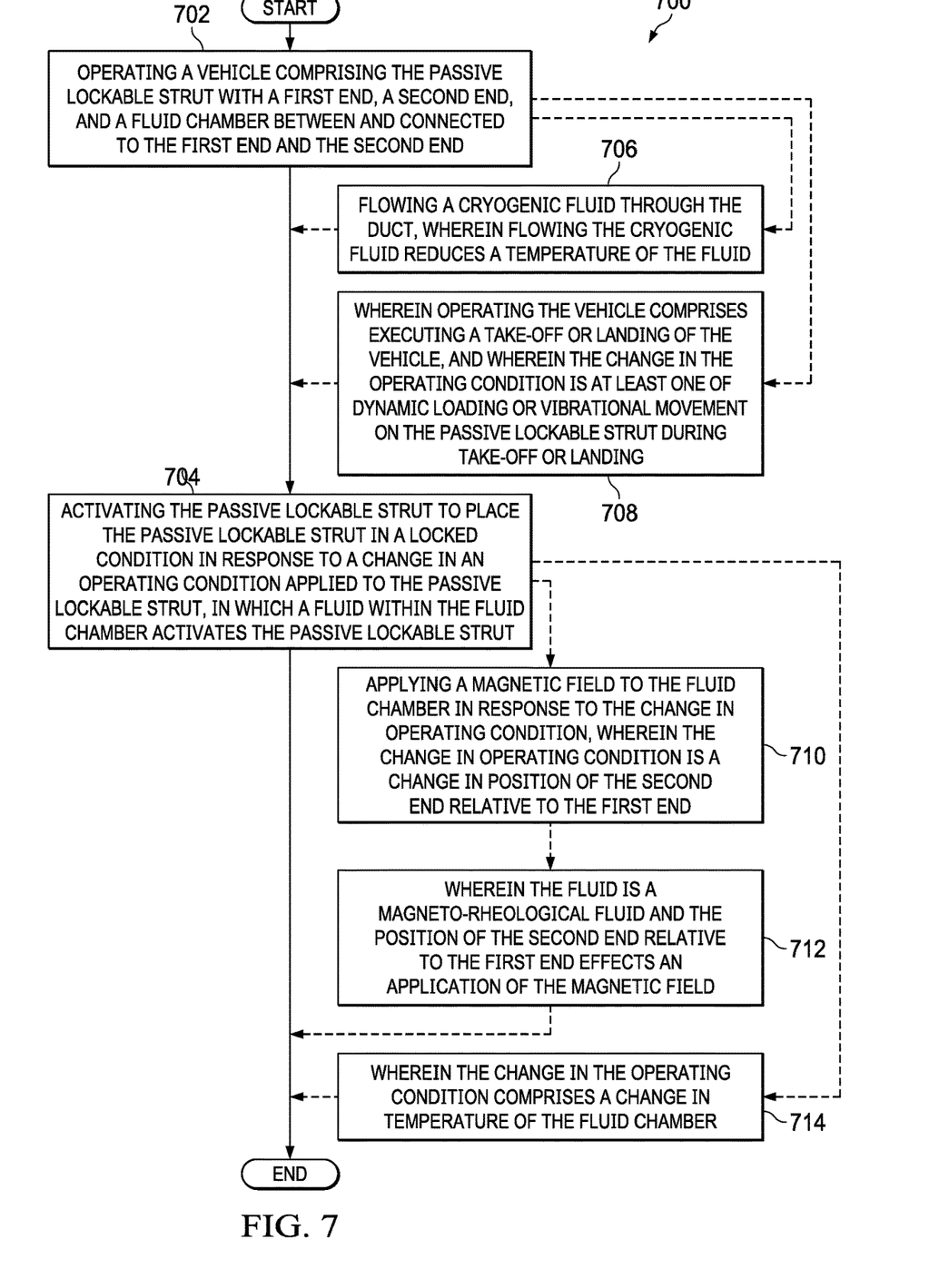
FIG. 7 is an illustration of a flowchart of a method of activating a passive lockable strut to place the passive lockable strut in a locked condition, wherein the passive lockable strut is connected to a duct and a structure in accordance with an illustrative embodiment.

Turning now to FIG. 7, an illustration of a flowchart of a method of activating a passive lockable strut to place the passive lockable strut in a locked condition is depicted in accordance with an illustrative example. Method 700 is a method of activating a passive lockable strut, such as passive lockable strut 108 of FIG. 1. Method 700 may be implemented to place passive lockable strut 200 of FIG. 2 in a locked condition. Method 700 may be implemented to place passive lockable strut 302 of FIG. 2 in a locked condition. Method 700 may be implemented to place passive lockable strut 400 of FIG. 4 in a locked condition. Method 700 may be implemented to place passive lockable strut 502 of FIGS. 5 and 6 in a locked condition, such as locked condition 602.

Method 700 operates a vehicle comprising the passive lockable strut with a first end, a second end, and a fluid chamber between and connected to the first end and the second end (operation 702). Method 700 activates the passive lockable strut to place the passive lockable strut in a locked condition in response to a change in an operating condition applied to the passive lockable strut, in which a fluid within the fluid chamber activates the passive lockable strut (operation 704). Afterwards, method 700 terminates.

The passive lockable strut is activated in any desirable fashion. In some illustrative examples, the passive lockable strut is connected to a duct and a structure and method 700 flows a cryogenic fluid through the duct, wherein flowing the cryogenic fluid reduces a temperature of the fluid (operation 706). In some illustrative examples, the change in the operating condition comprises a change in temperature of the fluid chamber (operation 714).

In some illustrative examples, method 700 applies a magnetic field to the fluid chamber in response to the change in operating condition, wherein the change in operating condition is a change in position of the second end relative to the first end (operation 710). In some illustrative examples, the fluid is a magneto-rheological fluid and the position of the second end relative to the first end effects an application of the magnetic field (operation 712). In some illustrative examples, operating the vehicle comprises executing a take-off or landing of the vehicle, and wherein the change in the operating condition is at least one of dynamic loading or vibrational movement on the passive lockable strut during the take-off or landing (operation 708).

The flowcharts and block diagrams in the different depicted examples illustrate the architecture, functionality, and operation of some possible implementations of apparatus and methods in an illustrative example. In this regard, each block in the flowcharts or block diagrams may represent a module, a segment, a function, and/or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram. In some illustrative examples, not all blocks of method 700 are performed. For example, operations 706 through 712 of FIG. 7 are optional.

Figure 8:
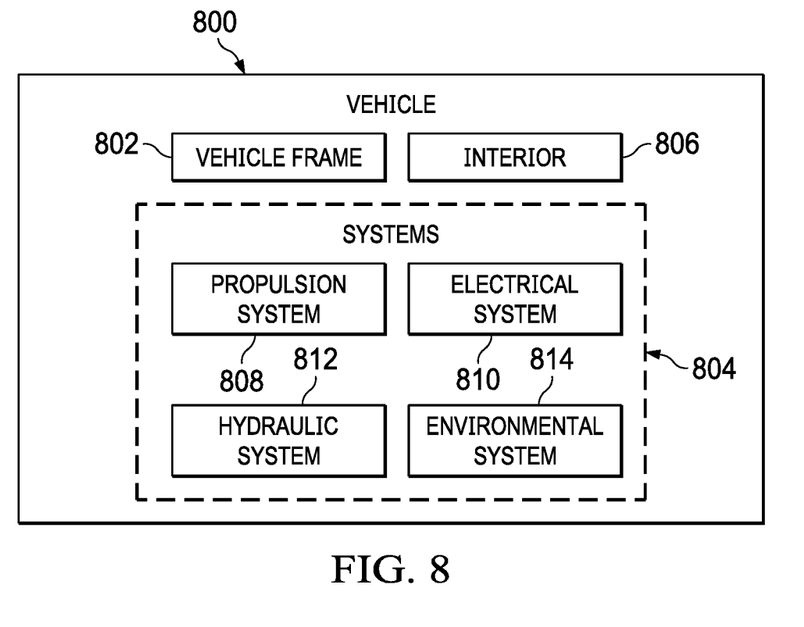
FIG. 8 is an illustration of a vehicle in a form of a block diagram in which an illustrative example may be implemented.

The illustrative examples of the present disclosure may be described in the context of vehicle 800 as shown in FIG. 8. With reference now to FIG. 8, an illustration of a vehicle is depicted in which an illustrative example may be implemented. In this example, vehicle 800 may include vehicle frame 802 with a plurality of systems 804 and interior 806. Examples of systems 804 include one or more of propulsion system 808, electrical system 810, hydraulic system 812, and environmental system 814. Any number of other systems may be included. Although a vehicle example is shown, different illustrative examples may be applied to other industries, such as the manufacturing industry. Vehicle 800 may be any desirable type of vehicle, such as a train, automobile, aerospace vehicle, construction vehicle, or any other type of vehicle.

Apparatuses and methods embodied herein may be employed in vehicle 800. In some illustrative examples, passive lockable strut 108 may be connected to at least one of vehicle frame 802 or one of plurality of systems 804. For example, passive lockable strut 108 may be a component of hydraulic system 812. In some illustrative examples, propulsion system 808 may include a cryogenic tank and ductwork. In some illustrative examples, passive lockable strut 108 may be connected to propulsion system 808 and a component of vehicle frame 802. Apparatuses and methods embodied herein may be employed in operating vehicle 800.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The illustrative examples provide a passive lockable strut. The passive lockable strut allows for the strut to change between a set length in a locked condition and a variable length in an unlocked condition without an active instruction by an operator or a computer. The passive lockable strut changes between a locked condition and an unlocked condition using a change in the operational conditions applied to the passive lockable strut.

The passive lockable strut decreases the complexity of support strut systems. For example, the passive lockable strut does not utilize communication devices for locking or unlocking the passive lockable strut. Decreasing the complexity of the passive lockable strut may also decrease the cost of the passive lockable strut. By reducing the quantity of components associated with the passive lockable strut, the support strut system including the passive lockable strut also has a lower weight than a conventional lockable strut system.

The passive lockable strut will find use in many different types of platforms and different environments. In some illustrative examples, the passive lockable strut may be implemented in a propulsion system of an aerospace vehicle. In some illustrative examples, the passive lockable strut takes the form of propulsion tubing support struts. These propulsion tubing support struts can be configured for optimal support during the critical flight phase, without compromise to also accommodate enforced quasi-static displacements variously experienced during nominal and contingency phases of propellant loading and unloading.

A type of activation, such as a temperature change, a vibration, or application of magnetic field, is selected based on a location of a passive lockable strut. Further, a degree of change for activation, such as temperature change, may be tailored for passive lockable strut. Types of passive lockable struts can be installed where and how they are most effective, allowing for a system that is both stiffer and lighter.

In aerospace applications, passive lockable struts can be installed where and how they are most effective during flight. Decreasing weight is desirable for aerospace applications, such as a launch platform.

When a non-Newtonian fluid is present in the passive lockable strut, the non-Newtonian fluid in the integral lock-up device allows for a simpler, cheaper, and more robust construction compared to traditional precision orifice flow type devices. Implementation of the lock-up device is further simplified by leveraging the nature of the strut load, which is essentially displacement controlled in the intended application.

The illustrations of the passive lockable struts in FIGS. 1-6 are not meant to imply physical or architectural limitations to the manner in which an illustrative embodiment may be implemented. Other components in addition to or in place of the ones illustrated may be used. For example, in one illustrative example, the axial lock-up device comprises nested, telescoping fluid reservoirs, whose chambers are separated by a large orifice, which connects the non-Newtonian fluid in the flanking/adjoining chambers, and allows for stress-free transfer of fluid from one chamber to the next during quasi-static events (tanking), but forms a rigid structural connection when subjected to dynamic events, such as flight. A number of embellishments can be envisioned to prevent function inhibiting bias. In some illustrative examples, flanking/counteracting centering springs sized to interfere with reasonable but potentially biasing handling/installation loads may be included. Such flanking/counteracting centering springs may be sized to not interfere with system/flight loads, which are normally much larger than potentially biasing handling/installation loads.

In some illustrative examples, the passive lockable strut may include an external visual indication of the internal piston position. An external visual indication includes through a transparent/translucent housing, or an external linear position indicator.

In some illustrative examples in which the direction and magnitude of the quasi-static adjustment/travel desired during operation is known, the strut can be installed in an intentionally counter-biased position, which would later be corrected as a result of operation of the platform, for example, as the system chills. Installing an intentionally counter-biased position would be useful when a nominally centered piston is more favorable/desirable during operation, such as in flight on an aerospace application.

In an illustrative example, a passive lockable strut not susceptible to bottoming out and less susceptible to overloading is presented. In this illustrative example, a compressible fluid piston, which would provide compliance is provided. In this illustrative example, the flanking fluids tend to keep the piston centered in the chamber, while providing a significant amount of dynamic damping, and performance/stability against lower frequency dynamic loading.

A passive lockable strut with this configuration with may be ideal in systems or specific support locations which have smaller amounts of desired quasi-static adjustability, and/or where a small amount of pre-load during flight is highly desirable. In some illustrative examples, springs in series (on both sides, on one side, of equal or differing stiffnesses) can be incorporated to extend and/or tune the dynamic/damping range of the passive lockable strut.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A passive lockable strut comprising:
    a first end;
    a second end;
    a fluid chamber between and connected to the first end and the second end; and
    a fluid within the fluid chamber, wherein the fluid is configured to activate the passive lockable strut to place the passive lockable strut in a locked condition in response to a change in an operating condition applied to the passive lockable strut without an active instruction by an operator or a computer.

2. The passive lockable strut of claim 1, wherein the fluid is a temperature activated fluid and the change in the operating condition is a change in temperature.

3. The passive lockable strut of claim 2, wherein the fluid is configured to place the passive lockable strut in a locked condition in response to a temperature equivalent to or below the freezing temperature of the fluid.

4. The passive lockable strut of claim 1, wherein the fluid is a magneto-rheological fluid and the change in the operating condition is an application of a magnetic field to the fluid chamber.

5. The passive lockable strut of claim 4, wherein the change in operating condition further comprises applying the magnetic field in response to movement of the second end towards the first end.

6. The passive lockable strut of claim 4 further comprising:
a piston connected to the second end; and
one of a number of magnets or magnetic shielding connected to the piston.

7. The passive lockable strut of claim 4 further comprising:
magnetic shielding connected to a portion of the fluid chamber;
a piston connected to the second end; and
a number of magnets connected to the piston.

8. The passive lockable strut of claim 1, wherein the fluid is a non-Newtonian fluid and the change in operating condition is an application of at least one of dynamic loading or vibrational movement to the passive lockable strut.

9. The passive lockable strut of claim 1 further comprising:
a piston having a piston head within the fluid chamber, wherein the fluid chamber, the fluid, and the piston form a variable length switch for the passive lockable strut.

10. The passive lockable strut of claim 1, wherein the first end and the second end are both connected to components of an aircraft.

11. A method of activating a passive lockable strut to place the passive lockable strut in a locked condition, the method comprising:
operating a vehicle comprising the passive lockable strut with a first end, a second end, and a fluid chamber between and connected to the first end and the second end; and
activating the passive lockable strut to place the passive lockable strut in a locked condition in response to a change in an operating condition applied to the passive lockable strut, in which a fluid within the fluid chamber activates the passive lockable strut without an active instruction by an operator or a computer.

12. The method of claim 11, wherein the change in the operating condition comprises a change in temperature of the fluid chamber.

13. The method of claim 11, wherein the passive lockable strut is connected to a duct and a structure, the method further comprising:
flowing a cryogenic fluid through the duct, wherein flowing the cryogenic fluid reduces a temperature of the fluid.

14. The method of claim 11 further comprising:
applying a magnetic field to the fluid chamber in response to the change in operating condition, wherein the change in operating condition is a change in position of the second end relative to the first end.

15. The method of claim 14, wherein the fluid is a magneto-rheological fluid and the position of the second end relative to the first end effects an application of the magnetic field.

16. The method of claim 11, wherein operating the vehicle comprises executing a take-off or landing of the vehicle, and wherein the change in the operating condition is at least one of dynamic loading or vibrational movement on the passive lockable strut during take-off or landing.

17. The method of claim 11, wherein the vehicle is an aircraft.

18. A vehicle comprising:
a duct;
a structure; and
a passive lockable strut connected to the duct and the structure, the passive lockable strut comprising a first end connected to the structure; a second end connected to the duct; a fluid chamber between and connected to the first end and the second end; and a fluid within the fluid chamber, wherein the fluid is configured to activate the passive lockable strut to place the passive lockable strut in a locked condition in response to a change in an operating condition applied to the passive lockable strut.

19. The vehicle of claim 18, wherein the duct is a cryogenic duct and the fluid is a temperature activated fluid.

20. The vehicle of claim 18, wherein the fluid is a non-Newtonian fluid configured to lock the passive lockable strut using at least one of dynamic loading or vibrational movement during take-off or landing of the vehicle.

21. The vehicle of claim 18, wherein the fluid is a magneto-rheological fluid configured to lock the passive lockable strut when a magnetic field is applied to the fluid chamber.

22. The vehicle of claim 18, wherein the passive lockable strut further comprises magnetic shielding connected to a portion of the fluid chamber, a piston connected to the second end, and a number of magnets connected to the piston.

23. The vehicle of claim 18, wherein the vehicle is an aircraft.

* * * * *